US005848778A

United States Patent [19]

Wagner

[11] Patent Number: 5,848,778

[45] Date of Patent: Dec. 15, 1998

[54] ENGINE BLOCK MOUNT

[76] Inventor: James W. Wagner, 130 Vreeland Ave., Leonia, N.J. 07605

[21] Appl. No.: 564,423

[22] Filed: Nov. 29, 1995

[51] Int. Cl.[6] .......... F16M 11/00

[52] U.S. Cl. .......... 248/676; 248/645

[58] Field of Search .......... 248/676, 645, 248/677, 678, 674, 675, 654; 408/87, 88

[56] References Cited

U.S. PATENT DOCUMENTS

| | | | |
|---|---|---|---|
| 4,234,275 | 11/1980 | Clement . | |
| 4,302,882 | 12/1981 | Bradley et al. . | |
| 4,358,229 | 11/1982 | Rukes . | |
| 4,461,447 | 7/1984 | Gottlob | 248/676 |
| 5,085,396 | 2/1992 | Mansson | 248/676 |

OTHER PUBLICATIONS

Advertisement for product identified as Boring Stand 2001 from the Lacey M. Williams Equipment Co., dated Jul. 1995.

*Primary Examiner*—Ramon O. Ramirez
*Assistant Examiner*—Willie Berry, Jr.

[57] ABSTRACT

An engine block mount for use in holding engine blocks in a secure manner during cylinder boring is disclosed. The engine block mount includes an electromechanical clamping system that has a hydraulic system for balancing the pressure exerted on an engine block. The engine block mount can also include an open table top that allows a variety of boring tools to be utilized. The open table top version of the engine block mount includes sliding parallels which are secured in place during operation of the engine block mount by the hydraulic system.

10 Claims, 12 Drawing Sheets

ENGINE BLOCK MOUNT

BACKGROUND OF THE INVENTION

This invention generally relates to engine boring. More particularly, it relates to methods and apparatus for mounting and supporting an engine block during the boring process.

Tremendous forces are exerted on engine blocks when the cylinders of the engines are being bored. In order to properly bore the cylinder, it is important to securely hold the engine block in place when the boring device is boring out the cylinder. Improper mounting of an engine block can result in the swaying or tilting of the engine block, which in turn causes misalignment and distortion and a poor quality rebuilt engine. Also, it is important to provide even holding pressure on the block during the boring process.

Existing engine block mounts do not adequately support the engine block during the boring process. Rather, they permit the engine blocks to tilt so that one end of the block is offset from the other end. They also permit the engine blocks to sway in the same manner the blocks twist during their operation as an engine. They also fail to apply even pressure on engine blocks.

As a result, new and improved engine block mounts that hold engine blocks parallel and square to cylinder boring tools are needed.

SUMMARY OF THE INVENTION

The present invention provides an improved engine block mount for use during cylinder boring. In accordance with the present invention, an engine block mount for holding an engine block in place is provided. The engine block mount includes a table top, a support bar for supporting the engine block, and an electromechanical lifting mechanism that lifts the support bar with the engine block on it toward the table top to secure the engine block. The engine block mount also includes a hydraulic system that balances the pressure exerted on the engine block during the operation of the mount.

In accordance with preferred embodiments of the present invention, sliding parallels are provided just under the table top to allow engine blocks to be supported at a variety of contact points. It is also preferred to provide a cutoff switch connected to the hydraulic system which stops operation of the electromechanical lifting mechanism when the pressure in the hydraulic system reaches a predetermined level. It is further preferred to include a device that allows adjustment of the predetermined level at which the cutoff switch stops operation of the electromechanical lifting mechanism. A gauge connected to the hydraulic system that indicates hydraulic pressure can also be provided.

The invention will now be further described in connection with certain illustrated embodiments; however, it should be clear to those skilled in the art that various modifications, additions and subtractions can be made without departing from the spirit and scope of the claims.

DESCRIPTION OF THE PREFERRED EMBODIMENT

Figure 1:
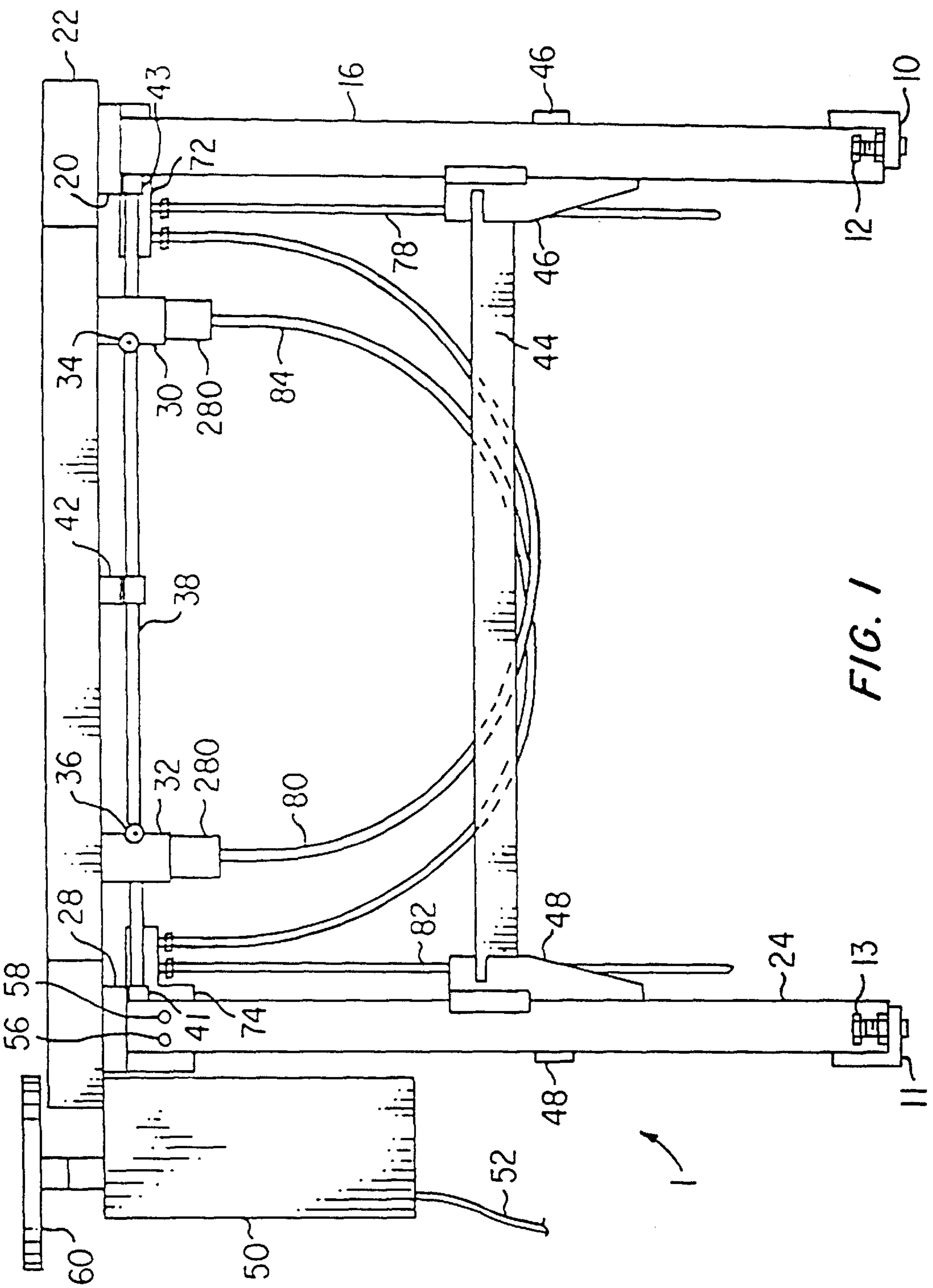
FIG. 1 illustrates a front view of the engine block mounting apparatus of the present invention.
Figure 2:
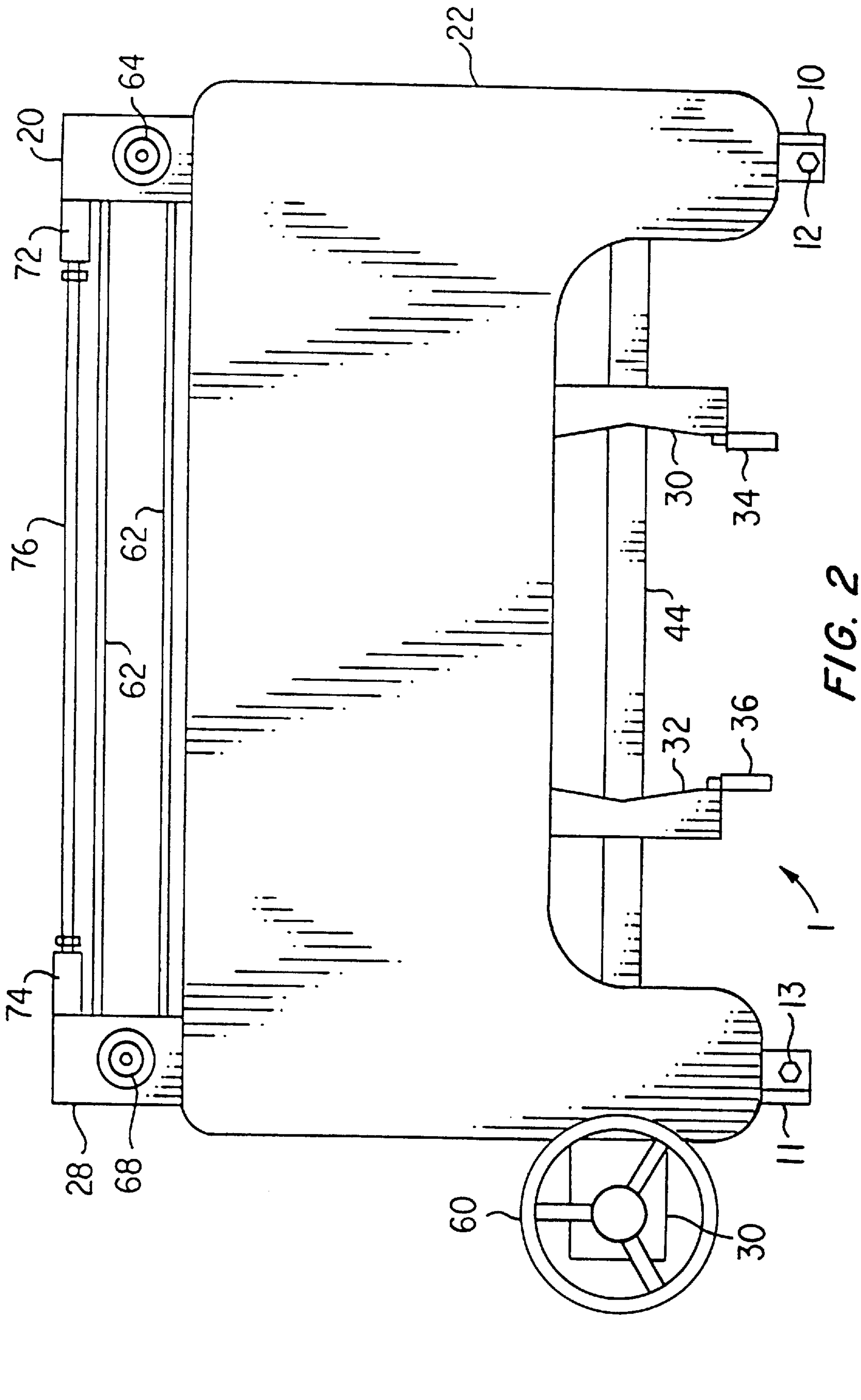
FIG. 2 illustrates a top view of the engine block mounting apparatus of the present invention.
Figure 3:
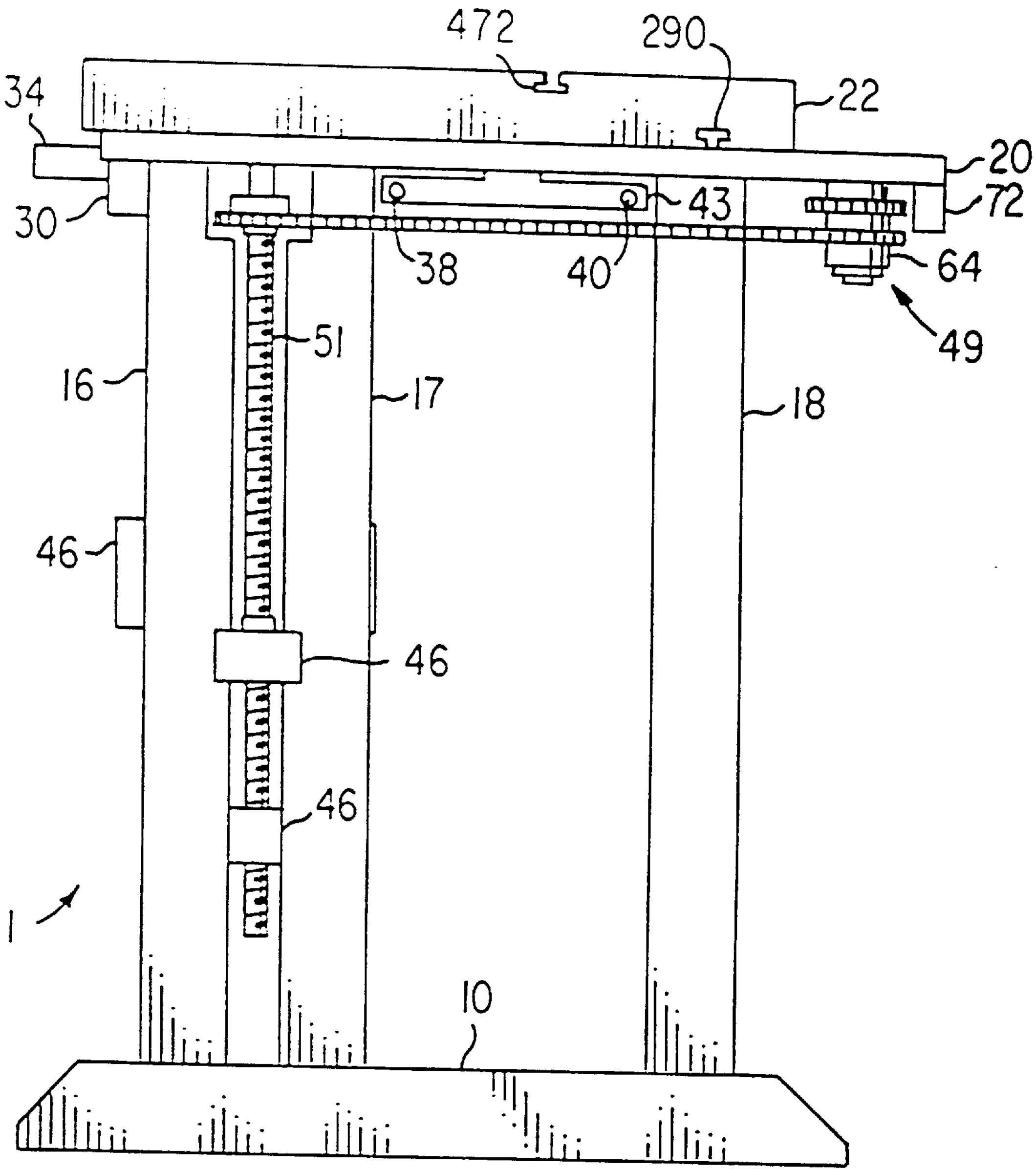
FIG. 3 illustrates a side view of the engine block mounting apparatus of the present invention.
Figure 4:
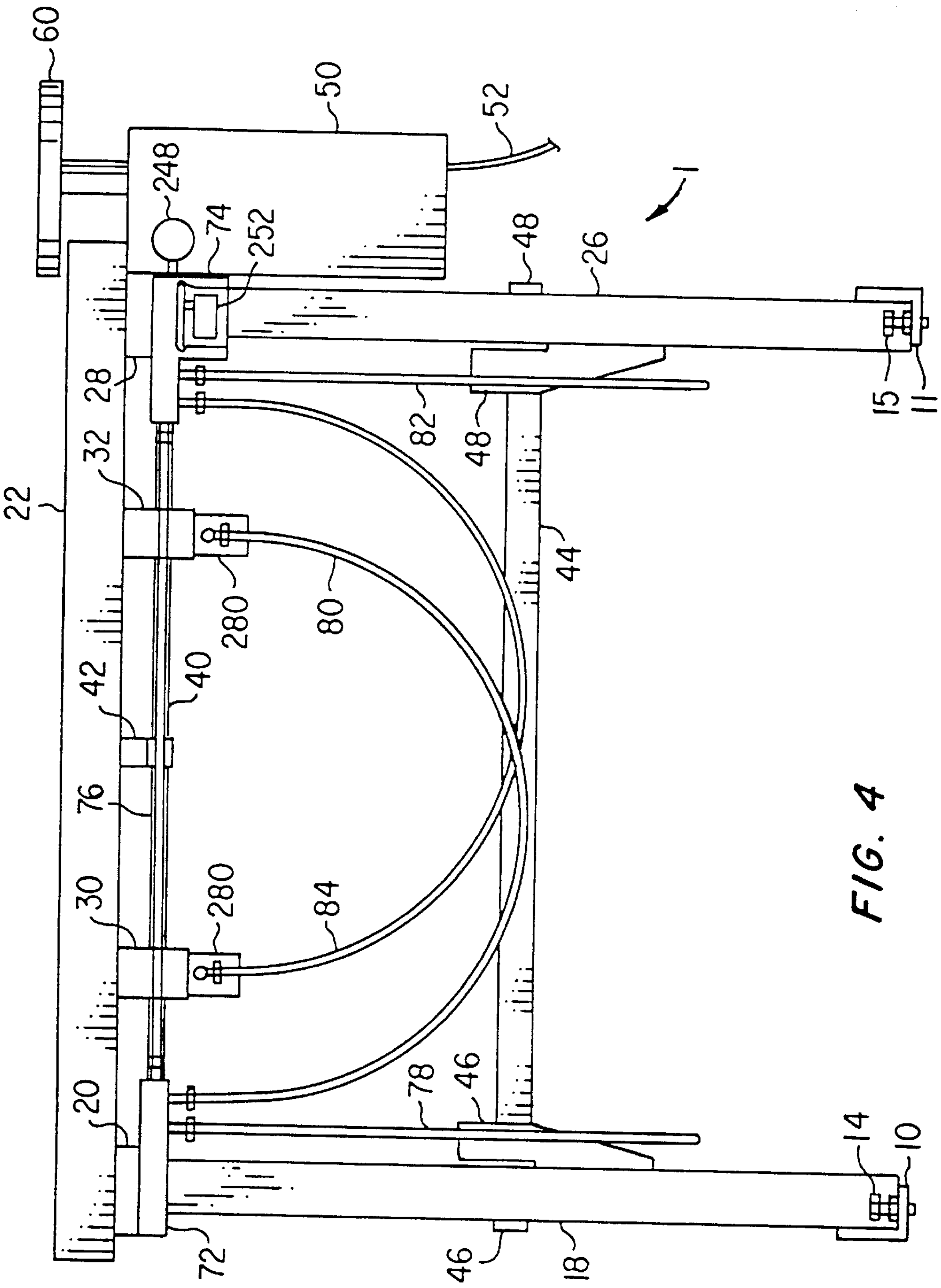
FIG. 4 illustrates a rear view of the engine block mounting apparatus of the present invention.

The engine block mount 1 of the present invention is illustrated in FIGS. 1 to 4. FIG. 1 shows a front view, FIG. 2 shows a top view; FIG. 3 shows a side view and FIG. 4 shows a rear view of the engine block mount 1. The general construction of the engine mount 1 in accordance with the present invention will be discussed with reference to these drawings.

The engine block mount 1 includes two floor rails 10 and 11. The floor rails 10 and 11 are preferably constructed from 2"×3"×½" hot roll steel angle. The floor rails 10 and 11 are shown in FIGS. 1, 2 and 4. The floor rail 10 is preferably supported on a floor structure with two leveling bolts 12 and 14. The floor rail 11 is also preferably supported on the floor structure with two leveling bolts 13 and 15. The bolts 12 to 15 are rotated to level the mount 1.

Three legs 16 to 18 (all shown in FIG. 3) are secured to the floor rail 10. The legs 16 to 18 are preferably constructed from 2"×3"×½" hot roll steel angle. Each of the legs 16 to 18 extend upwards to a side support structure 20 and a table top 22 where they are also secured. There are also three legs secured to the floor rail 11. In FIG. 3, the three legs secured to the floor rail 11 are opposite the legs 16 to 18. These legs are also preferably constructed from 2"×3"×½" hot roll steel angle. The front leg 24 is shown in FIG. 1 while the rear leg 26 is shown in FIG. 4. The middle leg is not visible in the drawings but, in FIG. 3, is located behind the leg 17. The legs attached to the floor rail 11 also extend upward and are secured to a side support structure 28 and the table top 22.

The side support structures 20 and 28 will be discussed in greater detail later. The table top 22 is preferably constructed from 2¼ hot roll steel plate. It is further preferred that the table top 22 be machined to provide as flat a surface as is possible, thereby allowing even pressure to be exerted on an engine block that is secured to the mount 1. In particular, it is preferred that the opposite sides of the table top 22 be ground flat and parallel with each other to a tolerance of plus or minus 0.0005 of an inch. The table top 22 is preferably secured to the side support structures 20 and 28.

Referring to FIG. 1, the engine mount 1 includes two sliding parallels 30 and 32. Each of the sliding parallels is slidably mounted on two bars which are attached at either end to the side support structures 20 and 28, thereby allowing the sliding parallels 30 and 32 to be moved along the plane of the table top 22. This allows the sliding parallels 30 and 32 to contact a variety of engine blocks in the proper position. For example, the sliding parallels can be moved so that the engine block mount 1 can support a V-8, a V-6, a straight 6, two cycle lawn mower engine blocks as well as virtually any other type of engine block. In general, the smaller the engine, the closer the sliding parallels 30 and 32 are moved to the middle. Each of the sliding parallels 30 and 32 preferably includes a handle 34 and 36, respectively, protruding from the front. The handles 34 and 36 are preferably threaded so that they can be attached and detached from the sliding parallels 30 and 32, as desired.

The sliding parallels are preferably constructed from hot roll steel. It is also preferred to grind the top and bottom of the sliding parallels 30 and 32 flat and parallel to a tolerance of plus or minus 0.0005 inch.

Referring to FIGS. 1 and 2, the front bar 38 which supports the sliding parallels 30 and 32 is shown. Referring to FIG. 4, the rear bar 40, which also supports the sliding parallels 30 and 32, is shown. This structure will be discussed in greater detail later.

Referring to FIGS. 1 and 4, a middle support member 42 and side support members 41 and 43 are shown. The bars 38 and 40 run through the middle support member 42 and the side support members 41 and 43. The middle support member 42 is also secured to the bottom of the table top 22 in a fixed position, that is, the middle support member 42 does not slide on the bars 38 and 40. The side support members 41 and 43 are secured to the side support structure 28 and 20, respectively. This arrangement prevents the bars 38 and 40 from sagging due to the weight they support.

A engine block support bar 44 is shown in FIGS. 1 and 4. When the mount 1 is in operation, an engine block is supported on the support bar 44. Typically, the bar 44 goes through the main bearing saddles in the engine block, although virtually any desired supporting mechanism can be used. Also, for smaller engine blocks, a variety of attachments, depending on the block type, can be used to secure the engine block.

The sides of the support bar 44 fit into vertical lift braces 46 and 48. The vertical lift brace 46 is supported by the legs 16 and 17 while the vertical brace 48 is supported by the leg 24 and the middle leg that extends upward from the floor rail 11.

An electric motor 50, which receives power via a cord 52 and which is operated by two switches 54 and 56, is secured to the side support structure 28. The switch 54 controls the rotational direction of the motor 50 and the switch 56 is a momentary switch that is used to turn the motor 50 on and off. The motor 50 drives a chain mechanism 49 which turns two threaded shafts 51 (FIG. 3) to raise and lower the vertical lift braces 46 and 48, depending on the rotational direction. Thus, when an engine block is on the bar 44, the engine block can be raised and lowered. When the mount 1 is used in the boring process, and engine block is raised to come in contact with the sliding parallels 30 and 32. When the engine block contacts the sliding parallels 30 and 32, the sliding parallels 30 and 32 are pressed against the bottom of the table top 22. This causes the engine block to be held securely in place—on the top by the sliding parallels 30 and 32 as well as the table top 22 and on the bottom by the bar 44.

A handle 60 is secured to the shaft of the motor 50 so that when the handle 60 is manually turned, the motor 50 turns. This allows hand control of the pressure exerted against the engine block. Thus, when the handle 60 is turned in one direction, the vertical lift braces 46 and 48 are raised to cause additional pressure to be exerted on the engine block.

Referring to FIGS. 1, 2 and 4, one of the chains 62 in the chain drive mechanism 49 that is used to raise and lower the vertical lift braces is shown in the rear of the engine block mount 1. Referring to FIG. 4, the chain 62 turns about a sprocket 64 which is mounted on the side support structure 20. The chain 62 also turns about a sprocket 68 which is mounted on the side support structure 28. The chain drive mechanism will be discussed in greater detail later.

The engine block mount 1 of the present invention utilizes a hydraulic system to provide even pressure and support on an engine block that is being supported. Referring to FIG. 1, the hydraulic system, in accordance with a preferred embodiment of the present invention, includes a first manifold 72 which is secured to the side support structure 20 and a second manifold 74 which is secured to the side support structure 28. The manifolds 72 and 74 are connected by a tube 76. A hose 78 is connected from the manifold 72 to a block that supports a piston in the vertical lift brace 46. A second hose 80 is connected from the manifold 72 to the sliding parallel 32. A third hose 82 is connected from the manifold 74 to a block in the vertical lift support structure 48. A fourth hose 84 is connected from the manifold 74 to the sliding parallel 30. The hydraulic system, including the manifolds 72 and 74, components in the vertical lift support structures 46 and 48, the sliding parallels 30 and 32 and the hoses and tubes, operate to provide even pressure on an engine block that is being supported.

Figure 5:
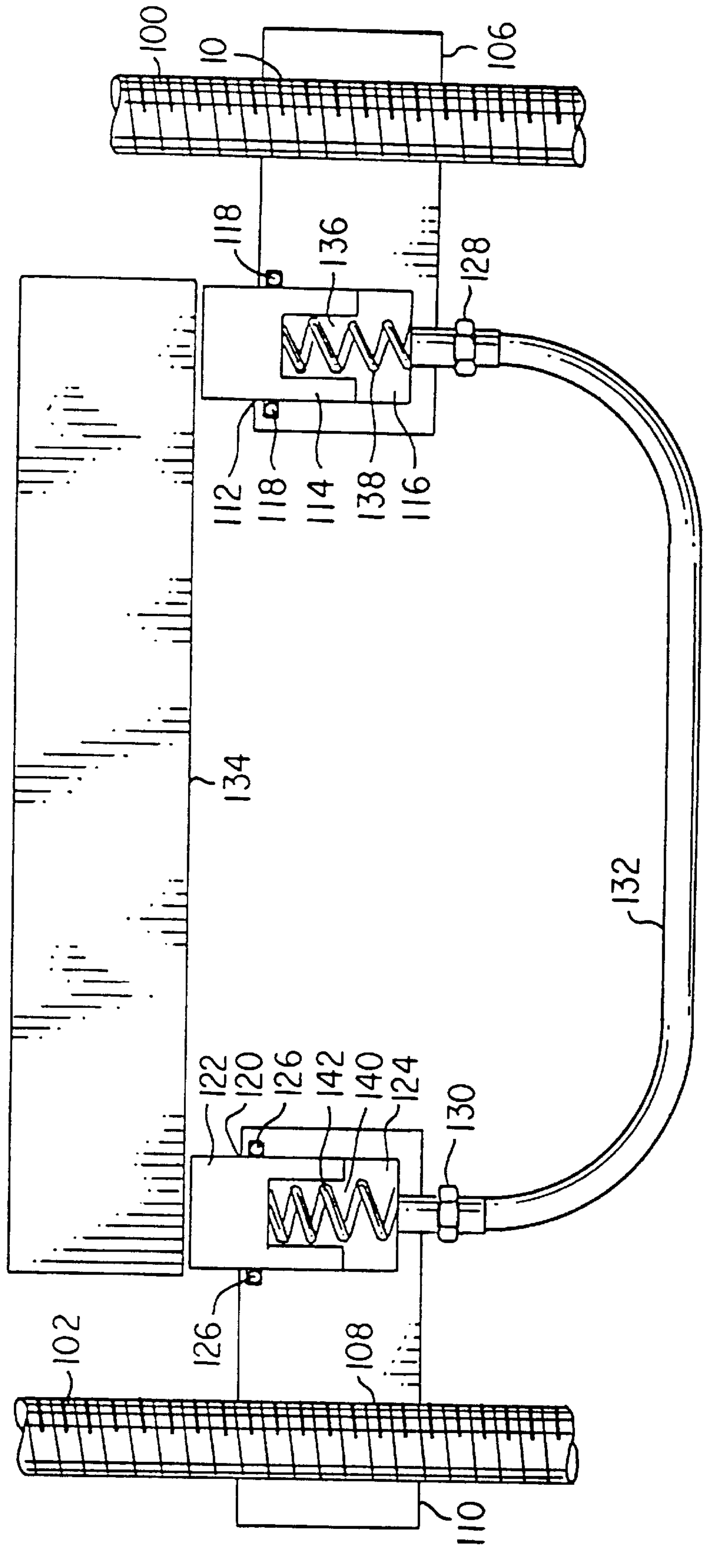
FIG. 5 schematically illustrates hydraulically balanced pistons used to balance the holding pressure exerted on an engine block in accordance with the present invention.

Referring to FIG. 5, a first part of the preferred hydraulic system of the present invention—specifically, the hydraulics used in the vertical lift braces 46 and 48—is functionally illustrated. In FIG. 5, two hydraulically balanced pistons 96 and 98 are preferably utilized in the present invention to lift the engine support bar 134 (bar 44 in FIGS. 1 and 4). It should be appreciated that FIG. 5 is merely illustrative in nature and is intended to show the operation of a first part of the hydraulic system; it is not intended to portray the preferred embodiment of the present invention. The preferred embodiment is described later.

In FIG. 5, two screws 100 and 102 extend down from either side of the engine mount 1 of the present invention. The screw 100 extends through a threaded section 104 of a piston support block 106. The screw 102 extends through a threaded section 108 of a second piston support block 10. The screws 100 and 102 are preferably turned in unison by the motor 50 or by the handle 60. When the screws 100 and 102 are turned in one direction, the piston support blocks 106 and 110 are raised. When the screws 100 and 102 are turned in the other direction, the piston support blocks 106 and 110 are lowered. This operation will be illustrated and described in greater detail later.

The piston support block 106 has an open cylindrical section 112 in which the piston 96 rests. Hydraulic fluid fills the cavity 116 below the piston 96. An O-ring 118 is positioned in a ridge in the cylindrical section 112 so that it surrounds the circumference of the piston 96, thereby retaining the hydraulic fluid in the cavity 116.

The piston support block 110 has a similar structure. The block 110 has an open cylindrical section 120 in which the piston 98 rests. Hydraulic fluid fills the cavity 124 below the piston 98. An O-ring 126 is positioned in a ridge in the cylindrical section 120 so that it surrounds the circumference of the piston 98, thereby retaining the hydraulic fluid in the cavity 124.

A fitting 128 is threaded into the bottom of the cylindrical section 112 of the block 106. Likewise, a fitting 130 is threaded into the bottom of the cylindrical section 120 of the block 110. Functionally, the cavity 116 is hydraulically connected to the cavity 124. This is illustrated in FIG. 5 by the connection of a hose 132 between the fittings 128 and 130.

As will be explained later, the hydraulic connections are somewhat more complicated, mainly due to the necessity of accommodating moving parts in the hydraulic system. For example, it is preferred to use a manifold system, as illustrated elsewhere in the drawings, to implement the hydraulic system since the manifold system allows easy movement of the components of the present system.

A bar 134 is positioned so that either end of the bar 134 rests on top of the pistons 96 and 98. During operation of the engine mount, an engine is supported on the bar 134. Thus, the weight of an engine on the bar 134 creates pressure on the pistons 96 and 98 and the hydraulic fluid in the cavities 116 and 124 is compressed. This results in the balancing of the pressure exerted by the pistons 96 and 98 on either side of the bar 134, so that both sides of an engine block are subjected to even pressure.

Still referring to FIG. 5, the piston 96 includes an inner hollowed cylindrical section 136 at the bottom of the piston 96. A spring 138 fits inside the hollowed cylindrical section 136 and rests against the bottom of the cylindrical section 112 of the block 106. The piston 98 also includes an inner hollowed cylindrical section 140 and a spring 142 fits inside the hollowed cylindrical section 140 and rests against the bottom of the cylindrical section 120 of the block 110. The operation of the springs 138 and 142 will be explained later.

Figure 6:
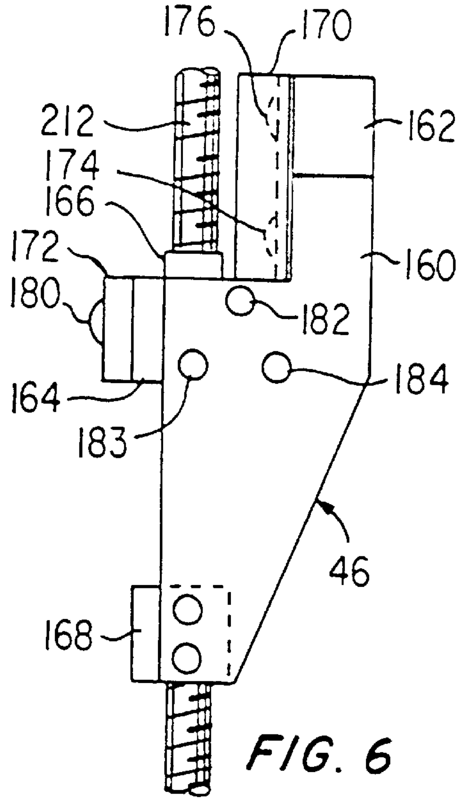
FIGS. 6 to 10 illustrate various views of the lifting mechanism of the present invention.
Figure 7:
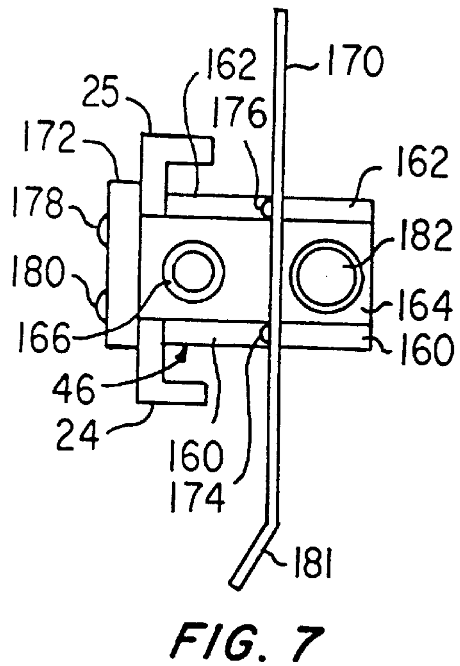
Figure 8:
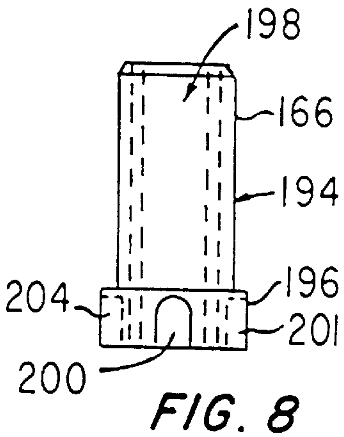

FIG. 6 to 10 illustrate, in greater detail, the vertical lift braces 46 and 48 that are shown in FIGS. 1 to 4. The vertical lift braces 46 and 48 are used in the preferred embodiment to support the bar 44 on which an engine block rests. Referring to FIG. 6, which is a side view of the vertical lift brace 46, the vertical lift brace 46 consists of a first side plate 160, a second side plate 162, a piston support block 164, a threaded insert 166, a support block 168, a first flange 170 and a second flange 172. These components are preferably made from cold roll steel. The first flange 170 is secured to the side plates 160 and 162 via screws 174 and 176. The second flange 172 is secured to the piston support block 164 via screws 178 and 180. The vertical lift brace 46 also includes a piston 182 mounted in the piston support block 164, as illustrated in FIG. 7.

Referring to FIG. 6, the second side plate 162 runs the length of the vertical lift brace 46. The first side plate 160, however, only extends from the bottom of the vertical lift brace 46 to approximately half way up the flange 170. Thus, the second side plate 162 looks the same as the first side plate 160 except for the area that extends up the flange 170. Referring to FIGS. 6 and 7, it is apparent that the upper portions of the side plates 160 and 162 form a channel in which the bar 44 is preferably place. This holds the bar 44 securely in place over the piston 174.

The L-shaped legs 24 and 25 of the engine mount 1 fit between the flanges 170 and 172 to hold the vertical lift brace 46 in place. Thus, the flange 170 is on one side of the legs of the mount 1 and the flange 172 is on the other side of the legs of the mount 1, as shown in FIGS. 1 and 3. The flange 170 preferably has a section 181 which is angled away from the center of the mount 1, thereby providing a guide for the bar 44 when it is placed between the legs of the engine block mount 1 of the present invention. The guide is preferred to ease the movement of the bar 44 and the engine it is supporting onto the vertical lift braces 46 and 48.

The piston support block 164 is secured to the side plate 160 via screws 182 to 184. It is also secured to the side plate

162 via screws, which are not visible. Similarly, the block 168 is also secured to the side plates 160 and 162 via screws.

Figure 9:
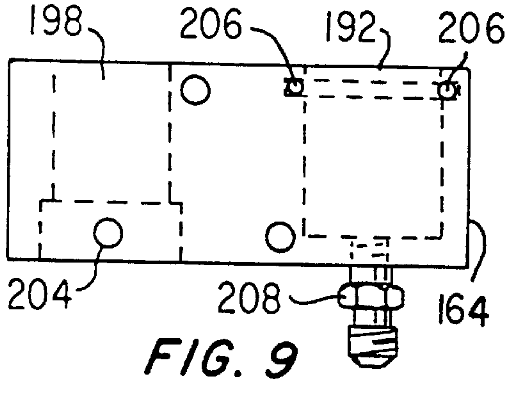

Referring to FIG. 9, the piston support block 164 includes a first open cylindrical section 190 and a second open cylindrical section 192. The first open cylindrical section 190 houses the threaded insert 166. The threaded insert 166 has a narrow cylindrical section 194 and a wide cylindrical section 196. The first open cylindrical section 190 in the piston support block 164 has matching sections. The threaded insert has a hollow center 198 where the threads run along the inner wall. At the bottom of the threaded insert 166 there are four oval recessed sections 200, 201 and 202 (only three are visible). When the threaded insert 166 is placed up into the open cylindrical section 190, it is preferred to line one of the oval recessed sections 200 to 202 up with the screw hole 204. Then when a screw is inserted, the threaded insert 166 is locked into place in the piston support block 164.

The second open cylindrical section 192 in the piston support block 164 includes a ridge on the inner wall where an O-ring 206 rests. The bottom of the second open cylindrical section 192 is preferably threaded so that it can receive a threaded fitting 208 to which one of the hydraulic hoses is attached.

Figure 10:
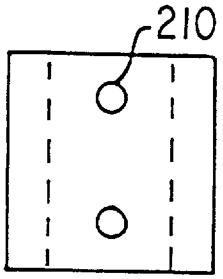

Referring to FIG. 10, the bottom block 168 is illustrated. This block 168 also has an open cylindrical section 210 which runs through the block 168 and which receives the threaded shaft 212 when the vertical lift brace 46 is lifted. As describe previously, the vertical lift brace 46 is raised and lowered by the turning of the threaded shaft 212 (electrically via the motor 50 or manually via the handle 60).

The vertical lift brace 48 is constructed in the same manner as the vertical lift brace 46. The pistons in the vertical lift braces 46 and 48 operate in the same way as described with respect to FIG. 5. Thus, when an engine block is placed on the bar 44, the bar 44 exerts pressure on the piston 182 in the vertical lift brace 46 and on the piston in the vertical lift brace 48. The hydraulic fluid channel between the cavity underneath the pistons in the vertical lift braces 46 and 48 causes the pressure on the pistons to be balanced. Thus, when the engine block is raised against the sliding parallels, balanced pressure is also exerted on the engine block.

Figure 11:
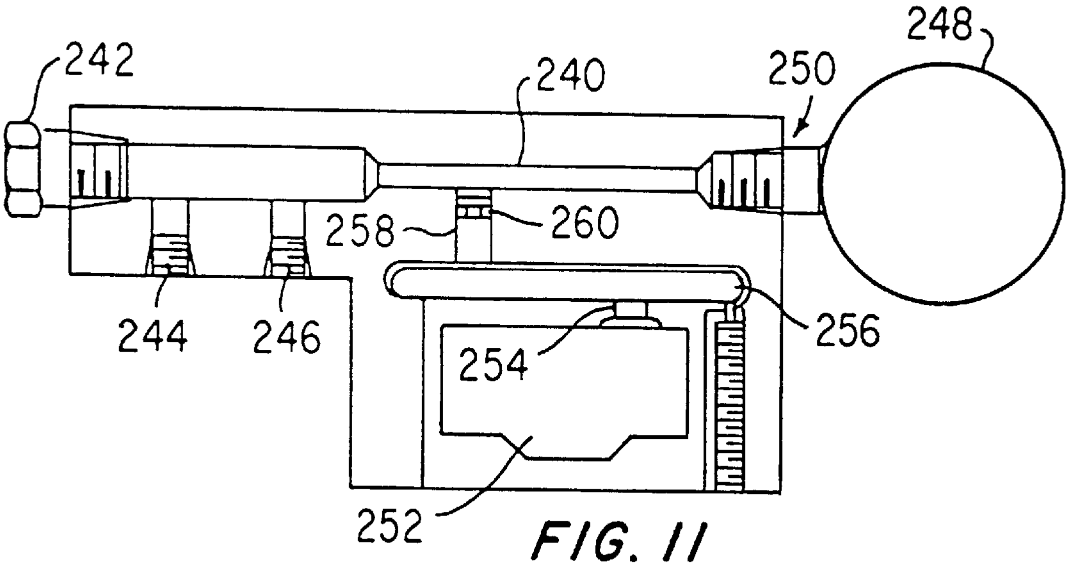
FIG. 11 illustrates a hydraulic manifold used in the present invention.

In FIG. 11, the hydraulic manifold 74 is illustrated. The manifold 74 includes a channel 240. Fittings 242, 244 and 246 are inserted into the openings of the channel 240. The tube 76 which runs between the manifolds 72 and 74 has a threaded fitting which is screwed into the fitting 242 on the manifold 74. The hose 84 which runs to one of the sliding parallels 30 has a fitting which is screwed into the fitting 244 on the manifold 74. The hose 82 which runs to the vertical lift brace 48 has a fitting which is screwed into the fitting 246 on the manifold 74.

A pressure gauge 248 is screwed into an end 250 of the channel 240 in the manifold 74. Hydraulic fluid fills the channel 240 as well as other hoses and cavities in the hydraulic system. Thus, when an engine block exerts pressure on the pistons in the vertical lift braces 46 and 48, hydraulic pressure is created. The gauge 248 thus provides an indication of the pressure being exerted on an engine block when the mount 1 is in operation. In accordance with a preferred embodiment, approximately 800 psi is built up in the hydraulic system.

The manifold 72 on the opposite side of the mount 1 includes the same channel 240 and fittings 242, 244 and 246 that have just been discussed. There is, however, no gauge and the other components (252, 254, 256, 258 and 260) illustrated in FIG. 11 are not provided. Since the channel 240 in the manifold 72 is connected to the channel in the manifold 74, the hydraulic forces in the manifolds 72 and 74 and in the pistons in the vertical lift braces, are the same.

The manifold 72 also includes a pressure cutoff switch that turns the motor 50 off when a certain pressure is reached. An electric switch 252 that includes a push button 254 is positioned in the bottom of the manifold 74. A lever 256 is positioned above the button 254. A piston 258 is positioned in a channel in the manifold 74 to exert pressure on the lever 256. An O-ring 260 prevents hydraulic fluid from escaping through the channel. The lever 256 has an adjustable spring plunger 261 exerting force at the other end and opposing the force exerted by the piston 258. The spring plunger 261 is preferably part number 27104 manufactured by Jergens. When the hydraulic force exerted on the piston reaches a certain level, it moves the lever 256 down so that the button 254 is depressed.

When the button 254 is depressed, it cuts off the motor 50 which has been lifting an engine block. However, because of the inertia of the motor 50, pressure in the hydraulic system continues to build. It is preferred that the plunger 261 be adjusted so that the motor 50 is cut off when the hydraulic pressure is approximately 350 psi. The pressure in the system will continue to grow to a level somewhat greater than 350 psi. It is then preferred that the handle 60 be turned to set the hydraulic pressure to approximately 800 psi, as indicated on the pressure gauge 248. Likewise, when the engine block is being lowered, it should be manually lowered via the handle 60 until a pressure less than 350 psi exists in the hydraulic system as which time the motor 50 can be used.

It is noted that the structure of the hydraulic system illustrated in FIGS. 1 and 11 differs from the schematic illustration of FIG. 5. Functionally, however, the systems operate in the same manner. The manifolds 72 and 74, because of the interconnection of their channels through the tube 76 and the interconnection of their cavities to the cavities beneath the pistons in the vertical lift braces 46 and 48, provide equal pressure at the pistons in the vertical lift braces 46 and 48.

Figure 12:
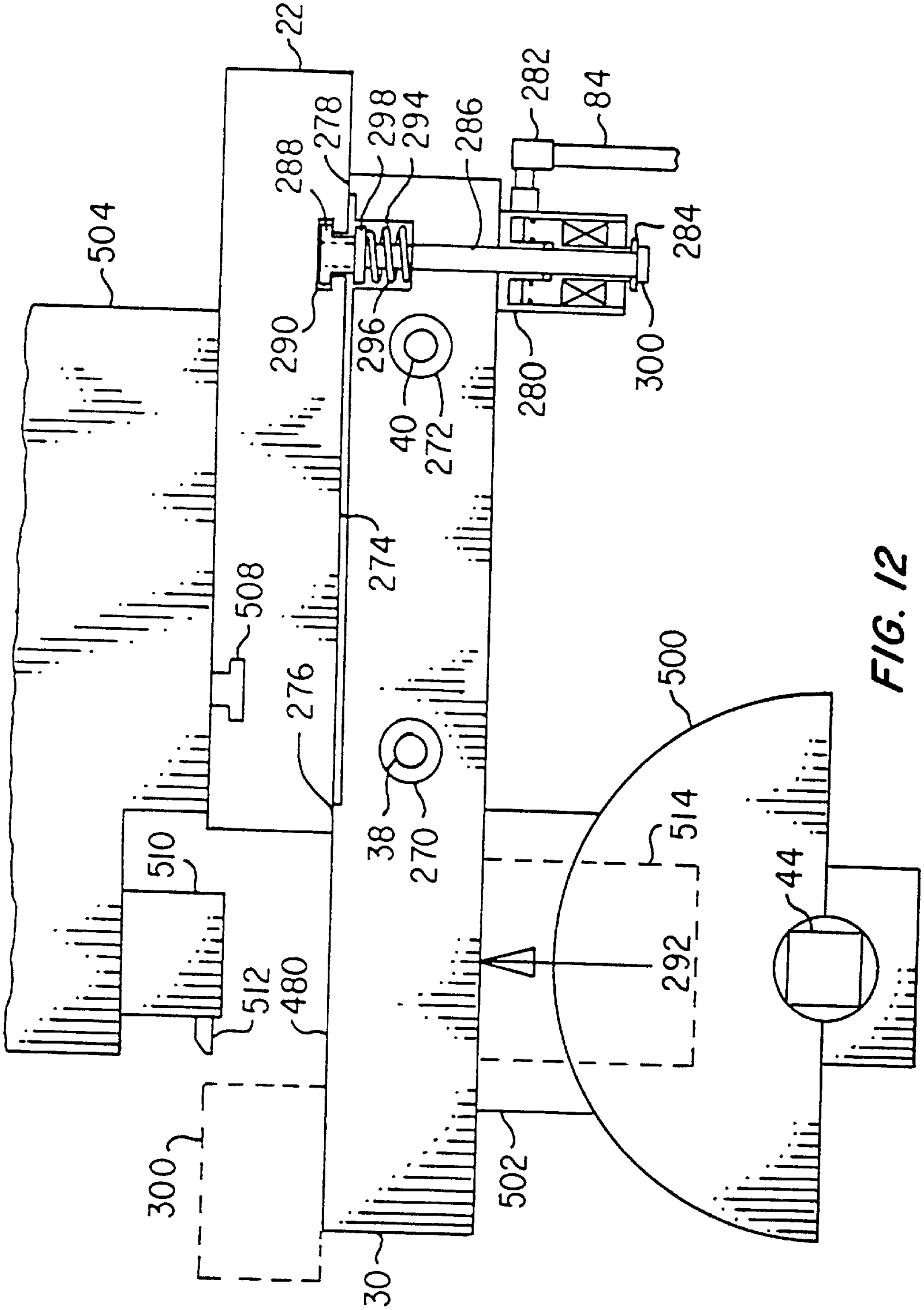
FIG. 12 illustrates the construction of sliding arms used in the present invention.

The manifolds 72 and 74 also provide hydraulic fluid to the sliding parallels 30 and 32. Referring to FIG. 12, the hydraulic operation in the sliding parallel 30 is illustrated. As previously described, the sliding parallel 30 is held in place via two bars 38 and 40 which run through linier bearings in the holes 270 and 272 in the sliding parallel 30. The sliding parallel 30 also contacts the bottom of the table top 22. It is preferred to construct the sliding parallel 30 by milling out a small area 274, preferably to a depth of 0.030", thereby providing the top support arm 30 with two contact points 276 and 278 with the table top 22.

The top arm support also includes a through bore hydraulic cylinder 280. One through bore hydraulic cylinder 280 which is preferably used is part number 60404 manufactured by Jergens. The through bore hydraulic cylinder 280 includes a fitting 282 for receiving hydraulic fluid thorugh the hose 84. When an engine block is placed on the bar 44 and hydraulic pressures are generated within the hydraulic system, the pressure inside the through bore hydraulic cylinder 280 starts to grow. As the pressure grows, the washer 284 on the through bore hydraulic cylinder 280 starts to be forced downward so that the shaft 286 is forced downward. As the engine block is brought up against the sliding parallels 30 and 32, the hydraulic pressure grows forcing the shaft 286 to be moved downward. As the shaft 286 moves downward, the cap 288 of the shaft 286, which fits inside a T-slot channel 290 in the table top 22, is forced downward and into contact with the table top 22. This locks the sliding parallel 30 in place and creates a force at the rear of the sliding parallel 30 to oppose the force created by the engine block at the front of the sliding parallel 30 in the area designated 292.

It is preferred to provide a spring 294 in a cavity 296 in the sliding parallel 30. The spring creates an upward force on a flange 298 on the shaft 286. This force opposes the force created in the hydraulic system when an engine block is initially placed on the bar 44, thereby allowing the movement of the sliding parallel 30. This movement is necessary to allow the sliding parallels to be moved along the bars to provide support of a variety of engine blocks. The through bore hydraulic cylinder 280 also preferably includes a nut 300 at the end of the shaft 286. Since the shaft 286 screws into the cap 288, the nut 300 can be adjusted to preload pressure on the shaft 286 so that the cap 288 does not hit the top of the T-slotted channel 290.

It should be noted that this construction would not be needed in the event that a non-open table top 22 is used. That is, if the table top 22 had a closed front section 300 in the front of the mount 1 which provided support on the slidable parallel 30 that opposed the forces created by the engine block in the area 292, the construction of FIG. 12 is unnecessary. In this case, the engine block would be accessed through a hole in the table top.

Figure 13:
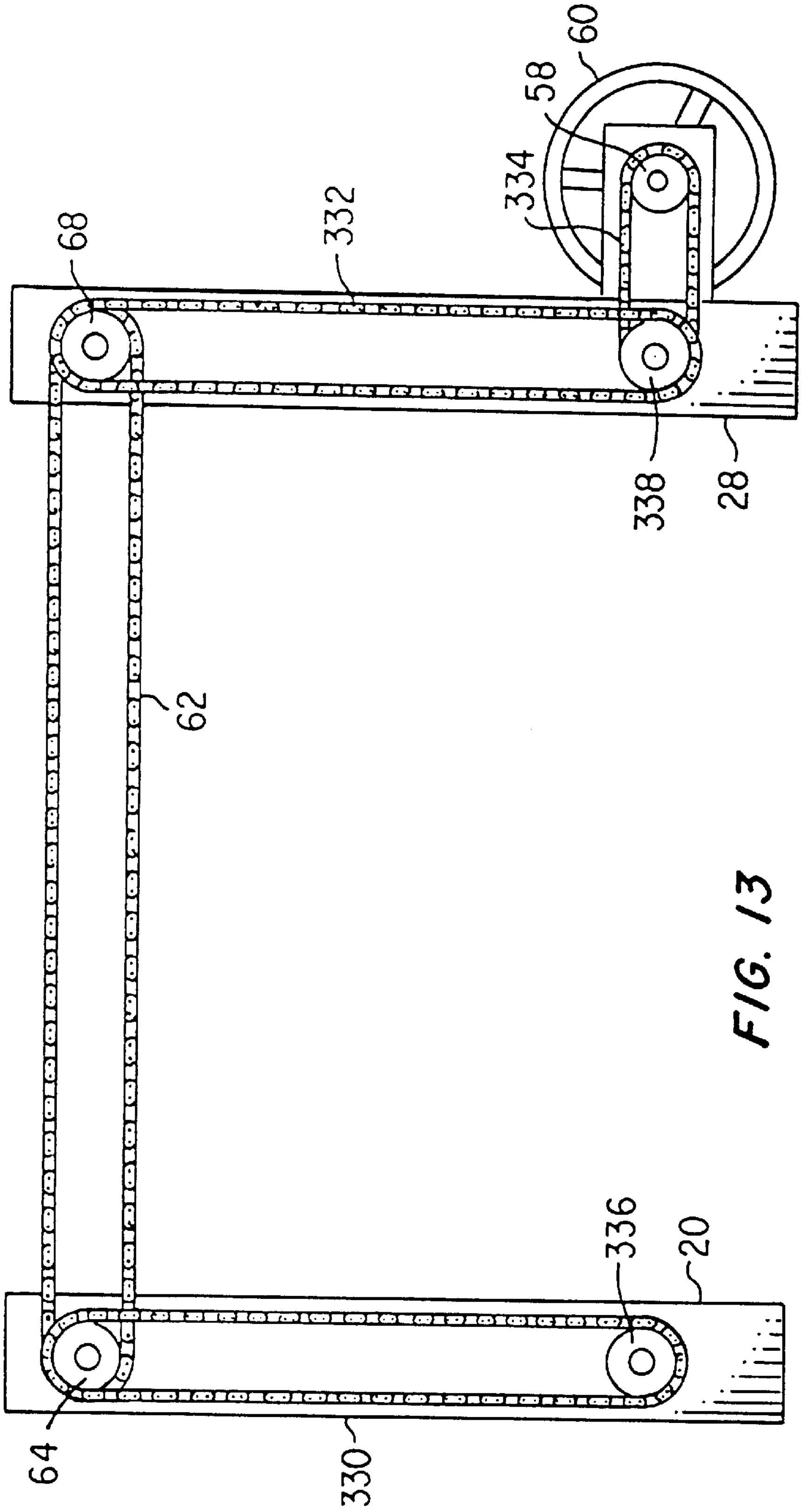
FIG. 13 schematically illustrates a top view of a motor controlled chain drive used to raise engine blocks in accordance with a preferred embodiment of the present invention.

FIGS. 13 to 16 illustrate the chain drive system of the present invention in greater detail. In FIG. 13, the motor 50, the handle 60, the side structures 20 and 28, the sprockets 64 and 68 and the chain 62 which were previously discussed, are illustrated. FIG. 13 also illustrates the remaining components of the chain drive system of the present invention: a second chain 330, a third chain 332, a fourth chain 334 and two sprockets 336 and 338. When the button 58 is depressed, the motor 50 turns in a direction determined by the switch 56. This causes the chain 334 to rotate so that the sprocket 338 rotates. Then, following the chains around, the chain 332, the sprocket 68, the chain 62, the sprocket 64, the chain 330 and the sprocket 336 all rotate together in the same direction. The threaded shaft (51 in FIG. 3 and 212 in FIG. 6), is attached to the sprockets 336 and 338. Thus, when the sprockets 336 and 338 turn, the threaded shaft 212 extending into the piston support blocks in the vertical lift braces 46 and 48 turn to raise or lower the vertical lift braces 46 and 48.

Figure 14:
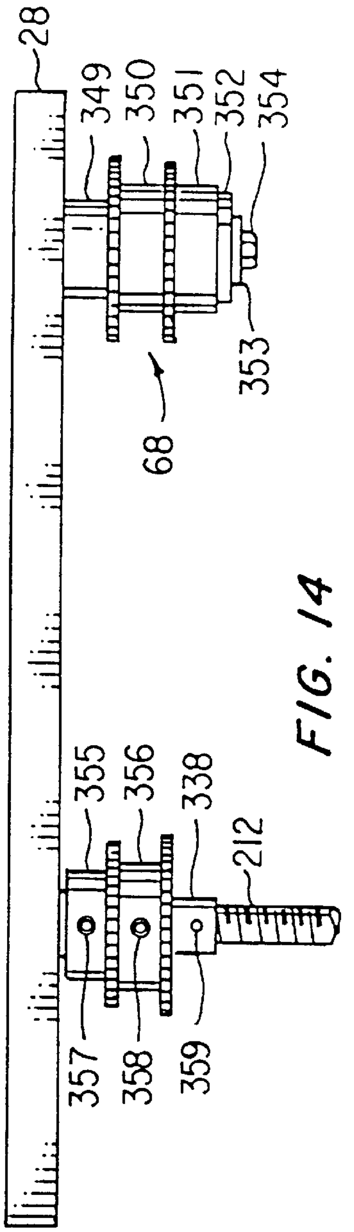
FIGS. 14 to 16 illustrate a side view of an arm used in the present invention.

Referring to FIG. 14, the side arm structure 28 is shown in greater detail. The sprocket 68 actually includes an idler sprocket mount 349, two sprockets 350 and 351, a thrust washer 352, a flat washer 353 and a mounting bolt 354. The chain 62 is mounted onto the sprocket 350 while the chain 332 is mounted onto the sprocket 351. The sprocket 338 also includes two sprockets 355 and 356 for the chains 334 and 332, respectively. The screw 212 which raises and lowers the vertical lift braces 46 and 48 as previously described is secured to the sprocket 338. Set screws 357 and 358 and spring pin 359 hold the sprockets 355 and 356 and the threaded shaft 212 in place.

Figure 15:
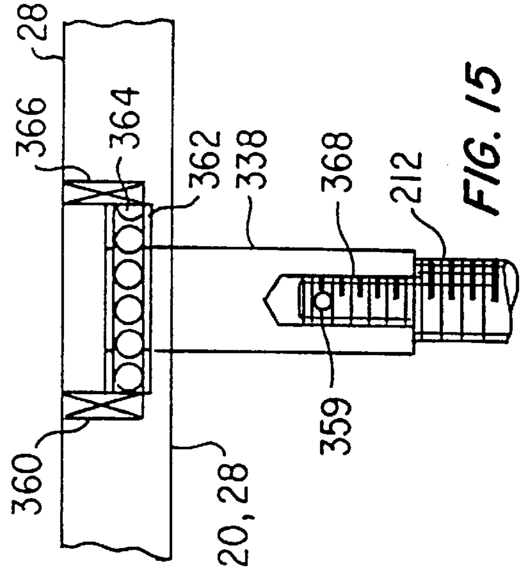

FIG. 15 shows the construction of the sprocket 338, without the geared sections attached, in greater detail. A roller bearing 360 is press fit into the side arm structure 28. A bottom race 362, then a thrust bearing 364 and then a top race 366 is placed into the side arm structure 28. This structure allows the sprocket 338 to easily rotate in the side arm structure 28. The sprocket 338 has a hollowed center 368 with a threaded inner section. The threaded shaft 212 has a threaded section that engages the threaded center section 368 of the sprocket 338 and is further held in place via the spring pin 359.

Figure 16:
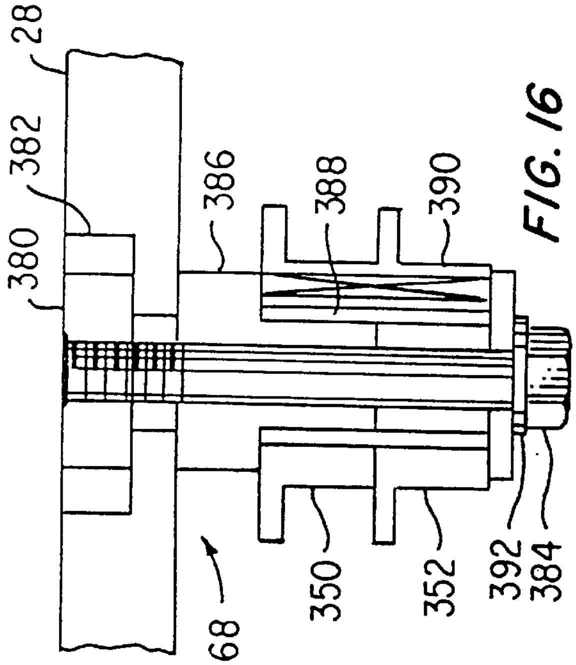

FIG. 16 illustrates the sprocket 68 in greater detail. An idler nut 380 having a threaded center section is placed in a cavity 382 in the side arm structure 28. A bolt 384 screws into the nut 382 to secure a T-shaped idler boss 386, the two sprockets 350 and 352, a bronze bushing 388, a spring pin 390 and a washer 392 in place.

Figure 17:
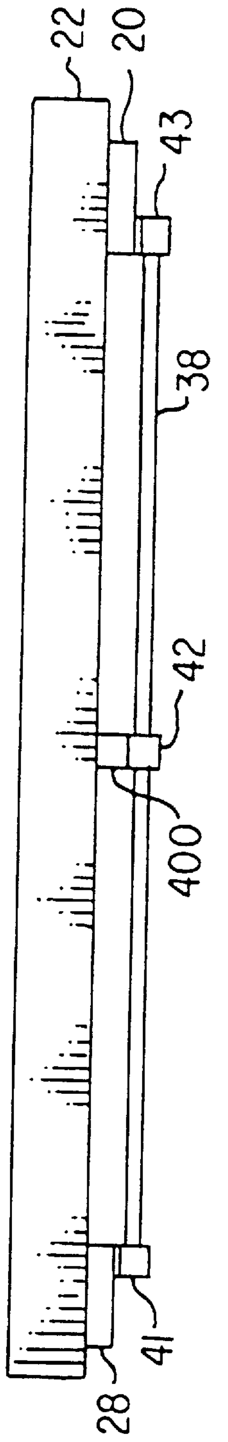
FIGS. 17 to 19 illustrate a support mount used in the present invention.
Figure 18:
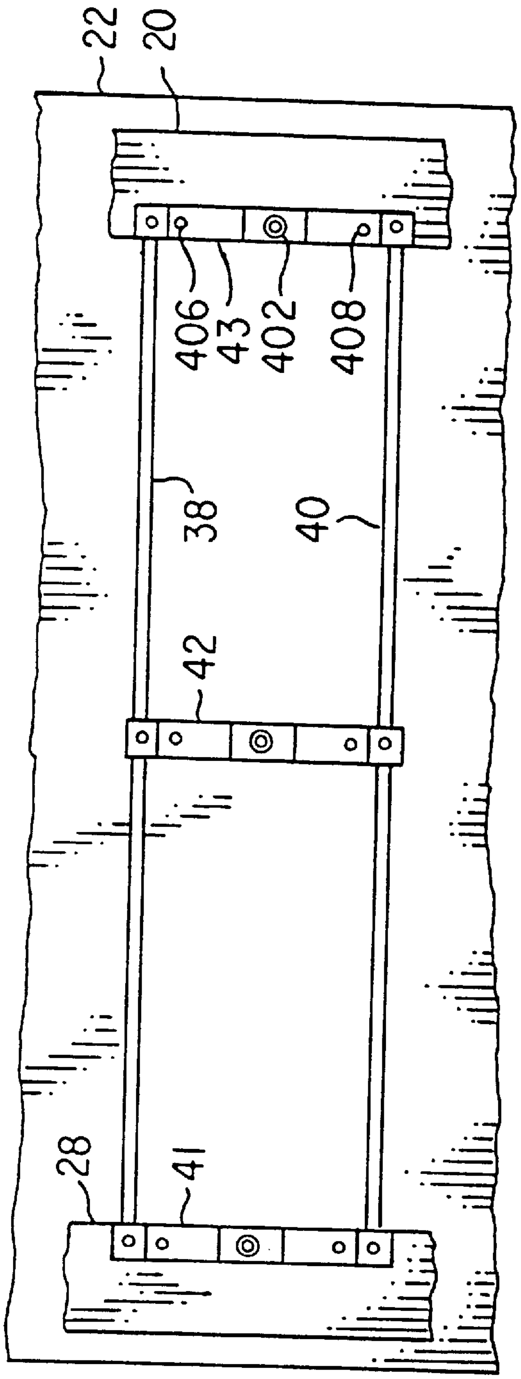
Figure 19:
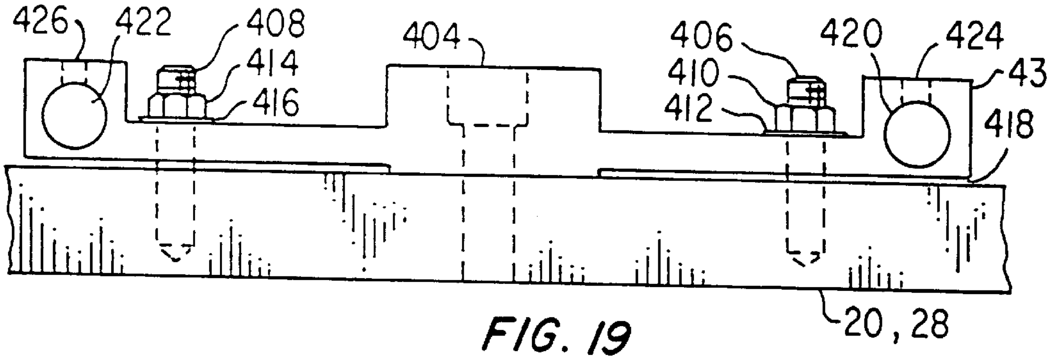

FIGS. 17 to 19 illustrate the preferred construction of the support members 41, 42 and 43. The middle support member 42 includes a solid spacer 400 and is attached to the bottom of the table top 22. The support members 41 and 43 are attached to the bottom of the side arm supports 28 and 20, respectively. In FIG. 18, the bars 38 and 40 which support the sliding parallels 30 and 32 are shown being supported by the support members 41 to 43.

In FIG. 19, the support member 43, which is representative of all of the support members, is shown upside down in greater detail. The support member 43 is attached to the side arm structure 20 via a bolt 402 through a hole 404. The bolt 402 is tightened securely. In addition, the sid arm structure 20 has bolts 406 and 408 extending downward through the support member 43. A nut 410 and a washer 412 are attached to the bolt 406 and a nut 414 and a washer 416 are attached to the bolt 408. The nuts 412 and 414 are not tightened to secure a milled out area 418 to the bottom of the side arm structure 20. Instead, they are snugged to leave the space generated by the milled out area 418 between the member 43 and the side arm structure 20. This allows some flexing of the bars 38 and 40 and is preferred to allow the sliding parallels 30 and 32 to securely hold the engine blocks. An area 0.600 inch deep is preferably milled out from each member 41 to 43.

The member 43 also inlcudes holes 420 and 422 through which the bars 38 and 40 extend. Set screws are inserted through the holes 424 and 426 to secure the bars 38 and 40 in place. The members 41 and 42 are similar to the member 43. The center member 42, however, must be secured to the table top 22 with longer nuts due to the spacer 400.

Figure 20:
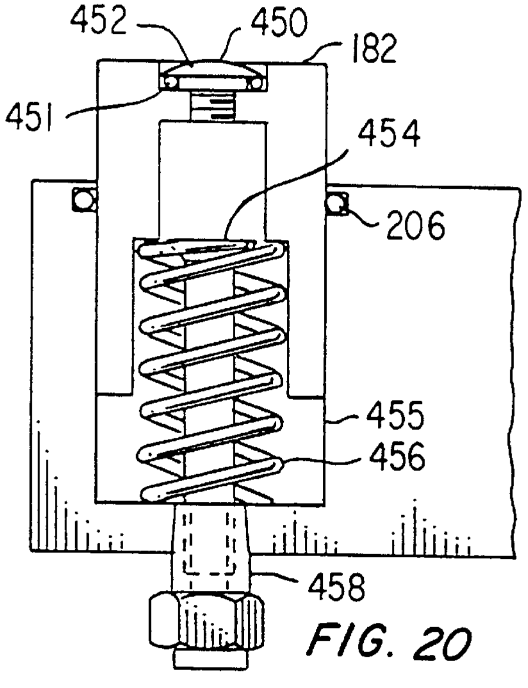
FIG. 20 illustrates a preferred construction of the hydraulically supported piston utilized to support an engine block.

FIG. 20 illustrates the pistons in the vertical lift braces 46 and 48 in greater detail. The diameter of the piston 182 is preferably one and one-eighth of an inch. The piston 182 includes a hydraulic bleeder port 450 which is sealed with an O-ring 451 and capped with a screw 452. The bleeder port 450 is utilized to bleed air out of the system. A screw 454 is screwed into the block 455 to retain and preload the spring 456. The preloaded spring minimizes the effect causes by an engine block which is not centered on the bar 44. The hydraulic fitting 458 is used to supply the hydraulic fluid to the assembly.

The boring process using the mount 1 of the present invention will now be described with reference mainly to FIG. 12. When boring an engine block 500, the engine block deck 502 (the head gasket surface) is raised to contact the sliding parallels. A boring machine 504 is secured to the table top 22 via a T-slot channel 508 in the top of the table top 22. A boring spindle 510 having a boring bit 512 is lowered into a cylinder 514 of the block 500. The cylinder 514 is then bored out by the bit 512.

It is understood that changes may be made in the above description without departing from the scope of the invention. It is accordingly intended that all matter contained in the above description and in the drawings be interpreted as illustrative rather than limiting.

I claim:

1. An engine block mount for holding an engine block in place, comprising:

a table top;

support means for supporting the engine block;

means for lifting the support means toward the table top in order to secure the engine block; and, hydraulic means for hydraulically balancing the pressure exerted on the engine block.

2. The claim of claim 1, further comprising sliding parallels located under the table top.

3. The claim of claim 1, further comprising a cutoff switch connected to the hydraulic means which stops operation of the means for lifting when the pressure in the hydraulic means reaches a predetermined level.

4. The claim of claim 3, further comprising means for adjusting the predetermined level at which the cutoff switch stops operation of the means for lifting.

5. The claim of claim 1, further comprising a gauge connected to the hydraulic means that indicates hydraulic pressure.

6. A method for holding an engine block in place, comprising the steps of:

supporting the engine block on a support mount;

lifting the supported engine block toward a top support located over the engine block to hold the engine block in place; and hydraulically balancing the pressure exerted on the engine block.

7. The method of claim 6, further comprising sliding two parallel arms located above the supported engine block so that the engine block will be contacted by the parallel arms when the engine block is lifted.

8. The claim of claim 6, further comprising the step of sensing the hydraulic pressure used to balance the pressure exerted on the engine block and stopping the lifting of the supported engine block when the pressure reaches a predetermined level.

9. The claim of claim 8, further comprising the step of adjusting the predetermined level at which the cutoff switch stops the lifting.

10. The claim of claim 6, further comprising the step of displaying the hydraulic pressure.

* * * * *